United States Patent
Kalm

[19]

[11] Patent Number: 6,161,681

[45] Date of Patent: Dec. 19, 2000

[54] ROLLER CONVEYER AND ROLLER SHAFT SUPPORT BRACKET

[75] Inventor: W. Scott Kalm, Plano, Tex.

[73] Assignee: Rapistan Systems Advertising Corp., Grand Rapids, Mich.

[21] Appl. No.: 09/239,138

[22] Filed: Jan. 28, 1999

[51] Int. Cl.[7] ................................................. B65G 13/07
[52] U.S. Cl. ................................ 198/790; 198/781.1
[58] Field of Search ................................. 198/790, 782; 193/35 R, 37

[56] References Cited

U.S. PATENT DOCUMENTS

| | | | |
|---|---|---|---|
| 3,255,865 | 6/1966 | Sullivan | 198/127 |
| 3,416,638 | 12/1968 | Buck | 193/35 R |
| 4,096,942 | 6/1978 | Shepherd | 198/790 X |
| 4,241,825 | 12/1980 | Brouwer | 198/782 |
| 4,278,166 | 7/1981 | Pirro, Jr. | 198/790 X |
| 4,832,184 | 5/1989 | DeGood | 198/781 |
| 4,887,707 | 12/1989 | Harms | 198/781 |
| 5,657,854 | 8/1997 | Chen et al. | 198/787 |
| 5,964,338 | 10/1999 | Schroader | 143/35 R |

*Primary Examiner*—James R. Bidwell
*Attorney, Agent, or Firm*—Jenkens & Gilchrist, P.C.

[57] ABSTRACT

A roller conveyor has rollers mounted on laterally-spaced side frames by brackets that have a frame attachment opening extending through a base portion of the bracket, and a roller shaft end receiving aperture extending through a flange portion of the bracket. The shaft receiving aperture is aligned at an oblique angle with respect to the frame attachment fastener opening such that when a fastener is inserted through the frame attachment opening and the bracket installed on a respective side frame, the shaft receiving aperture becomes misaligned with the end of the roller shaft to an extent sufficient to lock the shaft end in fixed relationship with the bracket and maintain a bias force on the fixed connection between the shaft receiving aperture of the flange and the roller shaft end.

50 Claims, 5 Drawing Sheets

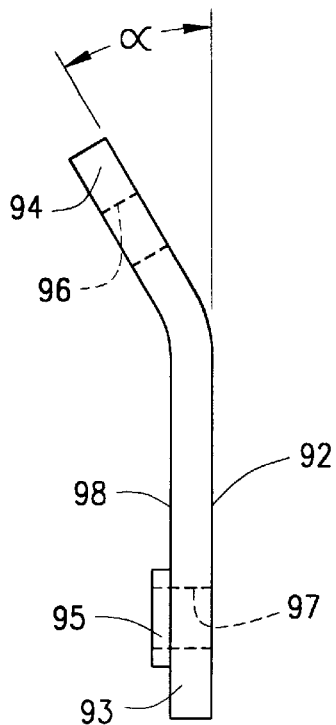
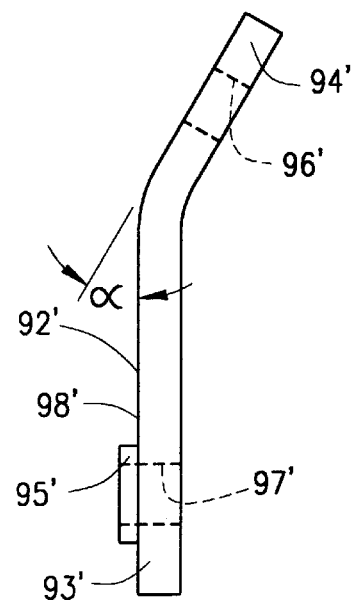
FIG. 9a    FIG. 9a
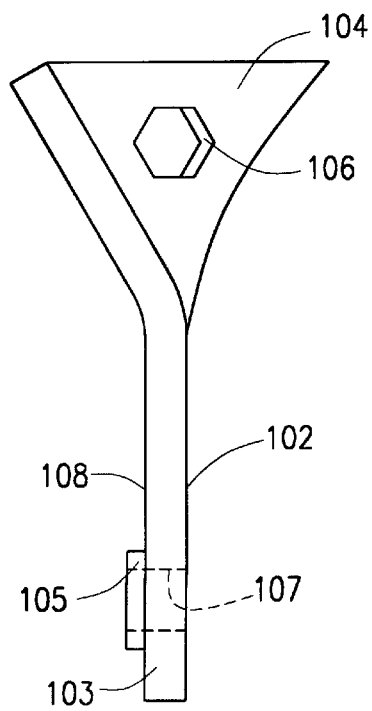
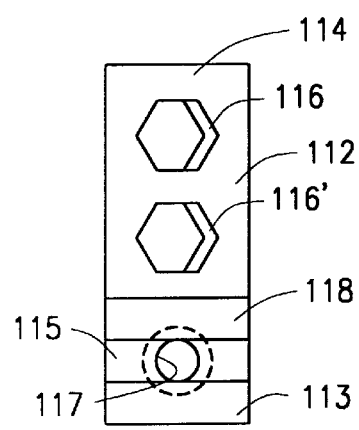
FIG. 10    FIG. 11

ROLLER CONVEYER AND ROLLER SHAFT SUPPORT BRACKET

BACKGROUND OF THE INVENTION

1. Technical Field

This invention relates to a roller conveyer suitable for installation on a ceiling or floor, or built into shelf facility. The present invention further relates to a roller shaft support that is used for such a roller conveyer and is adjustably positionable at a desired point of use within a side frame of the roller conveyer.

2. History of Related Art

U.S. Pat. No. 5,582,286, issued Dec. 10, 1996 to Kalm, et al., discloses a conventional prior art structure for a roller conveyer. In accordance with this conventional structure, a conveyer section is configured by providing a plurality of linear or tapered drive/transfer rollers supported by and extending between a pair of longitudinally extending side rail housings. Articles to be transferred by the conveyer section move along a longitudinal conveyer path whose extent and direction is defined by the side rail housings and supported rollers.

To mount the individual drive/transfer rollers to the side rail housings, holes are typically formed in the wall of the side rail housing into which a respective shaft end of each roller is inserted. Generally speaking, the cross-sectional shape of each roller shaft end is polygonal. More particularly, a hexagonal shape is conventionally used, but other polygonal, circular, or elliptical cross-sectional shapes may alternatively be used. The hole formed in the wall of the side rail housing has a shape corresponding to that of the roller shaft. In order to allow for easy insertion and extraction of rollers from the side rail frame, holes on at least one side of the conveyer must be slightly larger than the shaft. To assist in the insertion process, the shaft on end of each roller is spring-loaded. The non-spring-loaded shaft end of the roller is first inserted (at an angle to the conveyer path) into the larger one of the holes in the rail housing. The shaft on the copposite, spring-loaded, end of the roller is then loaded by depressing the spring-loaded end, and the roller is moved into position between the side rail housings. Once aligned with the hole on the opposite side rail housing, the spring-loaded shaft end is released, thus completing roller installation.

During operation of a roller conveyer, the drive rollers are intermittently actuated in order to control the transport of articles along the conveyer path. This intermittent actuation causes the roller shaft to rock back and forth within the slightly oversized holes in the side rail housing. After repeated occurrences of actuation and rocking back and forth, a rounding-off of the polygonal, or other, shape of either (or both) the roller shaft, or the side rail hole occurs. Eventually, this leads to failure of the roller mounting system, requiring a complete replacement of the side frame. Therefore, a need exists for a more stable and failure-resistant roller shaft mounting arrangement.

Moreover, the use of holes formed in the side rail housings to support a plurality of drive-transfer rollers fixes the position, pitch and orientation of the rollers along the conveyer path. Each reconfiguration of the rollers along the conveyor path undesirably may require the forming of new holes in an existing side rail housing. In more drastic reconfigurations, the formation of the required number of new holes in an existing side rail housing may be too difficult to implement, thereby requiring completely new side rail housings. Alternatively, additional holes formed in an existing side rail housing may weaken the structural integrity of the side rail housing. Replacement of the side rail housing, then becomes the only alternative. Thus, the above-referenced roller conveyer structures do not easily support roller reconfiguration, for example, to accommodate changes in pitch or changes in roller diameter. There is, accordingly, a need for linear or tapered roller support brackets that can be installed, removed and replaced without requiring the formation of new holes in the side rail housing or without affecting neighboring brackets.

The present invention is directed to overcoming the problems set forth above. It is therefore desirable to have a roller mounting bracket that is not only adjustable as to longitudinal position along the side frame of a conveyor, but also is easily adjusted after installation and during service to maintain the bracket in tightly fixed position with respect to the frame so that biased retention of the roller shaft end is maintained to prevent wear of the retention aperture in the brackets, or fretting of the roller shaft end.

SUMMARY OF THE INVENTION

In accordance with one aspect of the present invention, a roller conveyer has a pair of longitudinally extending side frames, each of which have a bracket mounting surface, a recessed channel and a slotted opening providing communication between the bracket mounting surface and the recessed channel. Brackets are mounted to each of the side frames, each bracket having a base portion which includes a frame contact face and a first opening extending through the base portion in perpendicular relationship with the frame contact face. Each of the brackets also has a flange portion which has an aperture extending through the flange portion in oblique angular relationship with the frame contract face of the base portion. A fastener attaches each of the brackets to a selected side frame and includes a first portion that extends through the first opening in the base portion of a respective bracket and a second portion that is disposed in non-rotatable relationship within the recessed channel of an associated side frame to which the bracket is attached. The roller conveyer also includes a plurality of rollers that are each rotatably mounted on a shaft having spaced-apart ends that extend through respective second openings through the flange portion of a selected pair of brackets. The roller shaft is maintained in biased non-rotatable relationship with respect to the selected bracket in response to tightening the fastener by which the bracket is mounted to the associated side frame.

Other features of the roller conveyer embodying the present invention include the flange portion of each bracket being obliquely disposed with respect to the frame contact face of the base portion and the second opening extending through the flange portion being normal to the obliquely disposed flange. Additionally, the size relationship between a predefined roller shaft end and the second opening extending through the flange portion, wherein a represents the angular relationship between a line normal to the second opening extending through the flange portion and the frame contact face of the base portion of the bracket, $d_1$ represents the diameter of the second opening extending through the flange portion, $d_2$ represents the diameter of one end of the predefined shaft on which a respective one of the rollers is rotatably mounted, and t represents the thickness of the flange portion through which the second opening extends, the diameter of the second opening is represented by the equation:

$$\frac{d_2}{\cos\alpha} + t\tan\alpha > d_1 > d_2$$

Other features of the roller conveyor embodying the present invention include the cross sections of the ends of the predefined shafts on which the rollers are mounted and the second openings extending through the flange portion of the brackets being similarly shaped polygons, with $d_2$ being the diameter of a circle circumscribing the polygonal opening extending through the flange portion and $d_1$ being the diameter of a circle circumscribing the polygonal cross section of the end of the predefined shaft. Additionally, in one embodiment, the defined similarly-shaped polygons are hexagons.

Other features include the bracket having an alignment embossment extending outwardly from the frame contact face of the base portion, wherein the embossment is adapted to be received within the slotted opening of the side frame on which the bracket is attached.

In another aspect of the present invention, a bracket for fixedly supporting one end of a shaft comprises a base portion and a flange portion. The base portion of the bracket has a frame contact face and a frame attachment fastener opening extending through the base portion in perpendicular relationship with the frame contact face. The flange portion extends outwardly from the base portion in a radial direction with respect to the frame attachment opening extending through the base portion, and has a shaft end receiving aperture extending through the flange at an oblique angle with respect to the frame contact face of the base portion.

Other features of the bracket embodying the present invention include the flange portion being obliquely disposed with respect to the frame contact face of the base portion, and the shaft end receiving aperture extending through the flange portion being perpendicular, or normal, to the flange.

Additionally, if a represents the angular relationship between a line normal to the second opening extending through the flange portion and the frame contact face of the base portion of the bracket, $d_1$ represents the diameter of the shaft end receiving aperture extending through the flange portion, $d_2$ represents the diameter of one end of a predefined shaft on which a respective one of the rollers is rotatably mounted, and t represents the thickness of the flange portion through which the second opening extends, the diameter of shaft end receiving aperture is represented by the equation:

$$\frac{d_2}{\cos\alpha} + t\tan\alpha > d_1 > d_2$$

BRIEF DESCRIPTION OF THE DRAWINGS

A more complete understanding of the structure and operation of the present invention may be had by reference to the following detailed description when taken in conjunction with the accompanying drawings, wherein:

FIGS. 8a and 8b are side views of alternate arrangements of the shaft mounting aperture in the bracket construction illustrated in FIG. 7;

FIGS. 9a and 9b are side views of alternate constructions of the bracket embodying the present invention;

FIG. 10 is a side view of yet another alternate construction of the bracket embodying the present invention; and FIG. 11 is an elevational view of still another alternate construction of the bracket embodying the present invention.

DETAILED DESCRIPTION OF PRESENTLY PREFERRED EXEMPLARY EMBODIMENTS

Figure 1:
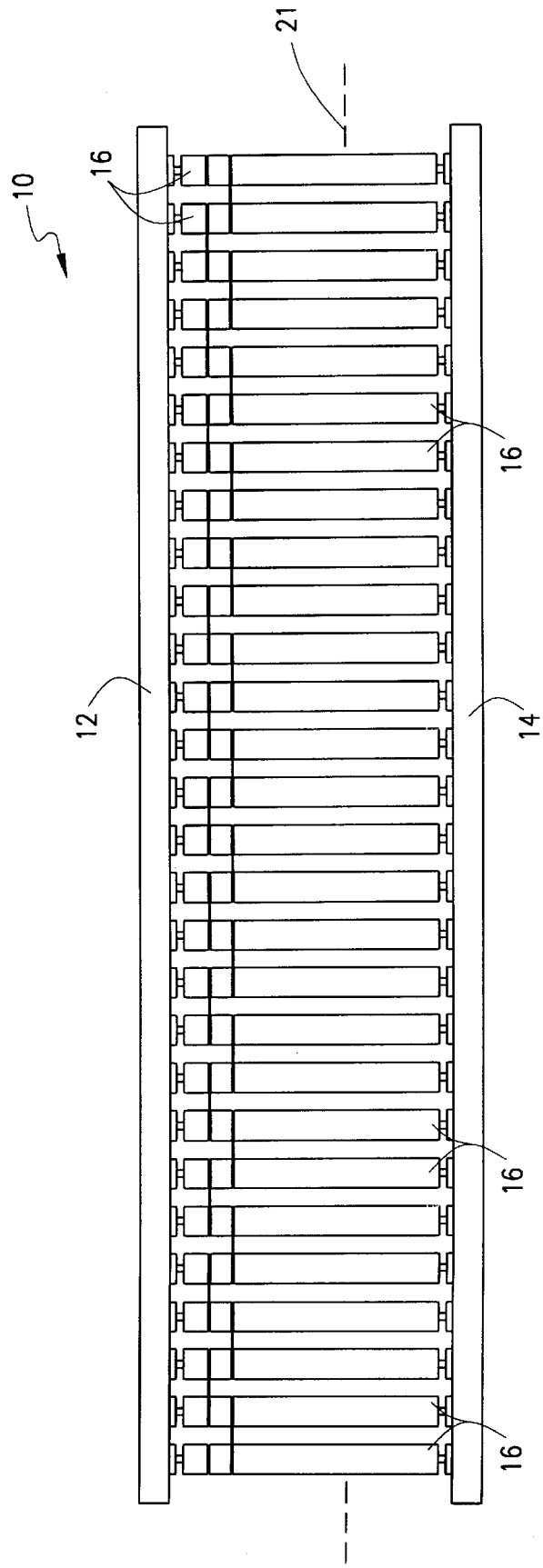
FIG. 1 is a plan view of a section of the roller conveyor embodying the present invention.
Figure 2:
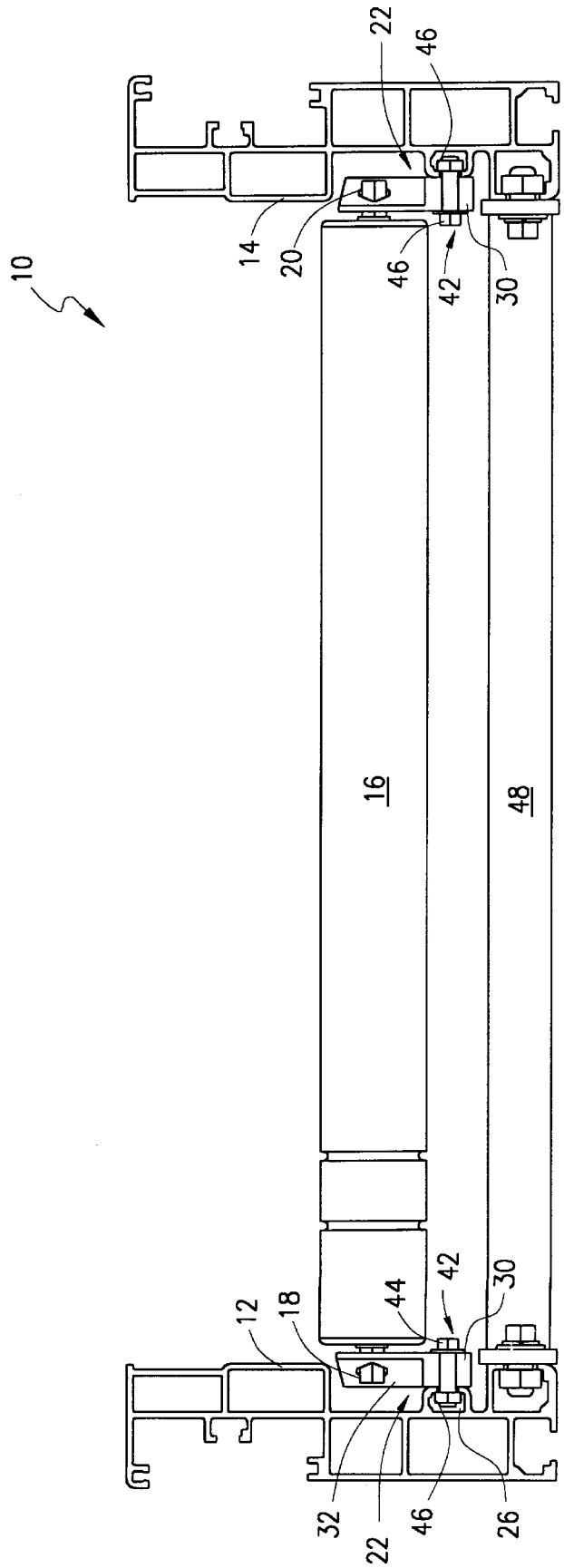
FIG. 2 is an end view of the roller conveyor section embodying the present invention.
Figure 3:
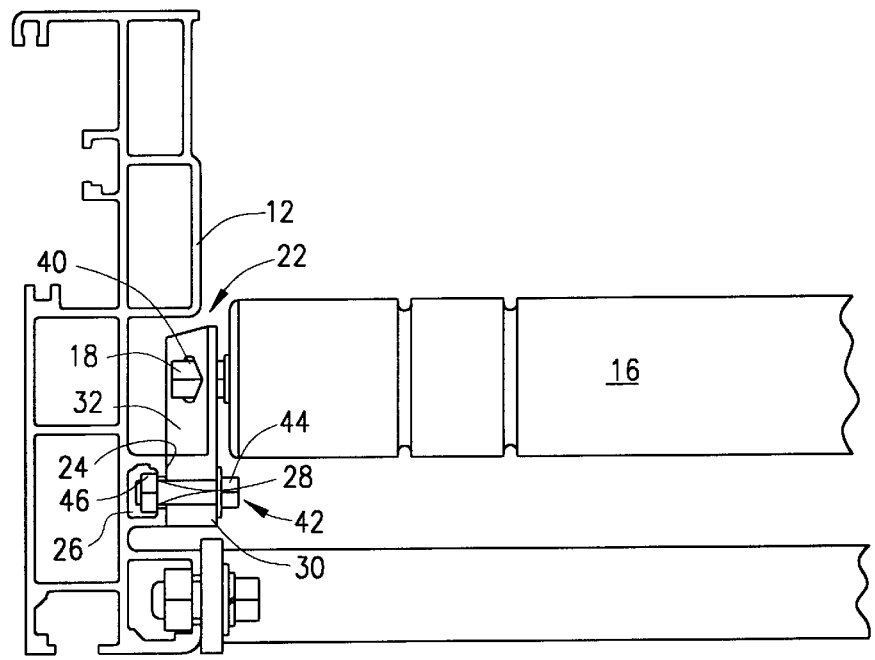
FIG. 3 is an enlarged view of one side of the end of the roller conveyor section embodying the present invention.

In the preferred embodiment of the present invention, shown in FIGS. 1–3, a roller conveyor 10 has a pair of longitudinally extending side frames 12, 14 and a plurality of rollers 16 that are each rotatably mounted by bearings, not shown, on a shaft having spaced-apart ends 18, 20. The side frames 12, 14 are equidistantly spaced from a longitudinal axis 21 defining the longitudinal centerline of the roller conveyor 10. The shafts ends 18, 20 are respectively fixedly mounted in one of a plurality of brackets 22.

Figure 4:
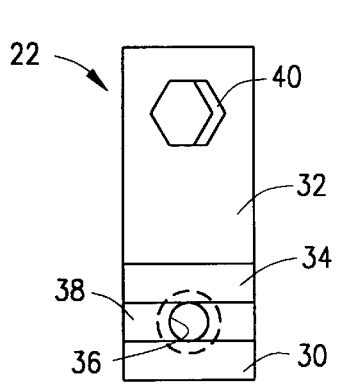
FIG. 4 is an elevational view of a bracket for fixedly supporting one end of a shaft, as illustrated in FIG. 3, embodying the present invention.
Figure 5:
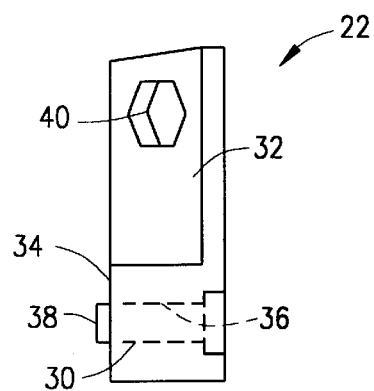
FIG. 5 is a side view of the bracket embodying the present invention shown in FIG. 4.

Each pair, i.e., first and second or left and right members, of the side frames 12, 14, have a bracket mounting surface 24, a recessed channel 26 and a slotted opening 28 providing communication between the bracket mounting surface 24 and the recessed channel 26. As illustrated in greater detail in FIGS. 4 and 5, each of the brackets 22 have a base portion 30 and a flange portion 32. The base portion 30 has a frame contact face 34 and a first, or frame attachment fastener, opening 36 extending through the base portion 30 in perpendicular relationship with the frame contact face 34. Desirably, an alignment embossment 38 extends outwardly from the frame contact face 34 of each bracket 22. The alignment embossment 38 has a width and thickness such that it can be freely seated within the slotted opening 28 of a respective side frames 12, 14 and yet not protrude into the recessed channel 26 of the respective side frame 12, 14. As will be described below in greater detail, the alignment embossment aids in the horizontal alignment of the bracket 22 as it is mounted to the respective frame 12, 14. Importantly, the alignment embossment 38 has a limited thickness so that the embossment 38 does not extend into the channel 26 when the bracket 22 is mounted which would prevent tight abutment of a nut retained within the channel 26 against the interior wall of the channel 26.

The flange portion 32 of each of the brackets 22 have a second opening, or shaft receiving aperture, 40 extending through the flange portion 32 in oblique angular relationship with the frame contact face 34 of the base portion 30. The flange portion 32 extends outwardly in a radial direction with respect to the first, or frame attachment fastener opening 36 in the base portion 30. In the preferred embodiment, the flange 32 is itself disposed obliquely with respect to the frame contact face 34 of the base portion 30, and the second opening, or shaft receiving aperture, 40 extending through the flange portion 32 is normal, i.e., perpendicular, to the flange 32. However, if desired, the flange portion 32 could have the same or a similar rectangular shape as the base, or other shape if so desired, provided the shaft receiving aperture 40 is disposed at an oblique angle with respect to the frame contact face 34 of the base portion 30.

Figure 6:
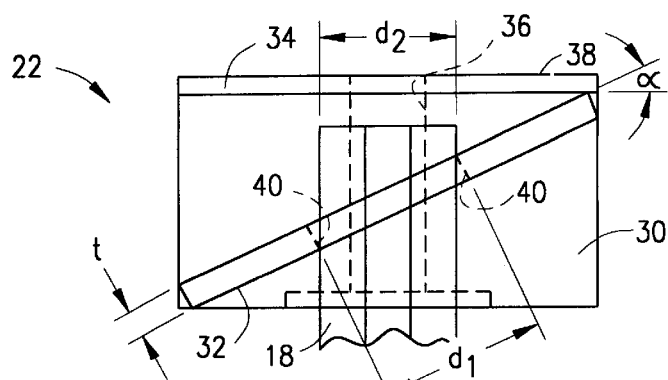
FIG. 6 is a top view of the bracket illustrated in FIGS. 3–5 for fixedly supporting one end of a shaft in accordance with the present invention, showing important angular and relative size relationships of bracket features in greater detail.

More specifically, the oblique angle, identified as a as shown in FIG. 6, represents the angular relationship between a line normal to the shaft receiving aperture 40 extending through the flange portion 32 and the frame contact face 34 of the base portion 30. With continued reference to FIG. 6, $d_1$ represents the diameter of the second opening, i.e., the shaft receiving aperture 40 extending through the flange portion 32, $d_2$ represents the diameter of an end 18, 20 of the shaft on which a respective one of the rollers 16 is rotatably mounted, and t represents the thickness of the flange portion 32 through which the shaft receiving aperture 40 extends. In the preferred embodiment, the aperture 40 extending through the flange portion 32 has a hexagonal shape, best illustrated in FIGS. 4 and 6, adapted to receive a similarly-shaped hexagonal end 18, 20 of the roller shaft. Although hexagonally-shaped shafts are generally used to mount rollers in many roller systems, other polygonal shapes such as octagonal, square, rectangular, or even circular or oval, may be used in carrying out the present invention if so desired. "Diameter" as used above represents the diameter of a circle circumscribing the respective hexagonal or other, if so used, geometric shape. Importantly, for the reasons described below, the diameter $d_1$ of the second opening, or shaft receiving aperture, 40 extending through the flange portion 32 an should be somewhat larger than the cross-sectional diameter $d_2$ of the respective shaft end 18, 20 extending through the aperture 40 but should be no greater than $$\left(\frac{d_2}{\cos\alpha}\right) + (t\tan\alpha).$$

That is, the diameter of the shaft receiving aperture 40 is represented by:

$$\frac{d_2}{\cos\alpha} + t\tan\alpha > d_1 > d_2$$

In a representative embodiment of the present invention, angle α is 26°, $d_1$ is 11.9 mm (0.47 in), the flange thickness t is 3.725 mm (0.15 in), and the shaft diameter $d_2$ is ⅜ in. (9.5 mm). Generally speaking, the angle a should desirably range from about 15° to about 30° for flanges up to 6.3 mm (0.25 in) thick.

Each of the brackets 22 is attached to a respective one of the side frames 18, 20 by a fastener 42. Each of the fasteners 42 has a first portion 44, such as a bolt or machine screw, that extends through the first frame attachment fastener opening 36 in the base portion 30 of the bracket 22 and a second portion 46 such as a threaded nut that is disposed in non-rotatable relationship within the recessed channel 26 of the selected side frame 18, 20 to which the bracket 22 is attached. To prevent rotation, the height of the channel 26 should be only slightly greater than the distance across the flats of a polygonally-shaped nut 46, and less than the distance between opposed apexes, i.e., the diameter of a circle circumscribing the nut 46. In this manner, the nut 46 can be installed in the channel through the slotted opening 28, and the bolt 44 threadably engaged with the nut 46 and tightened while the nut 46 is prevented from rotation due to the restricted height of the channel 26.

The conveyor 10, embodying the present invention has a lower frame member 48, which may be tubular in construction if so desired, that connects the two side frames 12, 14 together and maintains the side frames 12, 14 at a predetermined distance necessary to suitably support the laterally installed rollers 16. The rollers 16 are mounted to the side frames by first installing a pair of brackets 22, one on the left side frame 12 and the other on the right side frame 14, in approximate transverse, or laterally, aligned relationship representing the desired lateral orientation of the installed roller 16. The respective brackets 22 are loosely mounted to the respective side frame 12, 14 by first inserting a nut 46 of the fastener 42 into the recessed channel 26, as described above, then positioning a bracket 22 with a bolt extending through the frame attachment fastener opening 36 of the base portion 30, and then partially threading the bolt 44 onto the nut 46. This is rather easily accomplished since the nut 46 is prevented from rotation due to the restricted height of the channel 26 in which it is disposed.

A roller 16 is then mounted to the side rails by inserting the respective left and right shaft ends 18, 20 into a respective one of the laterally spaced brackets 22. This is also easily accomplished because the brackets 22 are still only loosely mounted on the respective side frames 12, 14 and can therefore be tilted, or canted, to provide initial installation clearance with the respective shaft ends 18, 20 due to the slightly larger diameter opening of the shaft receiving aperture 40 in the flange portion 32 of the bracket 22 with respect to the shaft end diameter. After the shaft ends are thereby loosely received and seated within respective shaft receiving apertures 40 in the flange portions 32 of a pair of laterally-spaced brackets 22, the bolt, or first portions, 44 of the fasteners 42 are tightened whereby the frame contact face 34 of the base portion 30 of the bracket 32 is drawn towards to the bracket mounting surface 34 of the respective side frame 12, 14. Tightening of the fastener 42 is continued until the shaft receiving aperture 40 becomes misaligned with respect to the shaft end 18, 20 received within the aperture 40 to such an extent that the laterally-spaced, i.e., diametrically opposed, sides of the aperture 40 come into tight abutment with the laterally-spaced sides of the shaft end 18, 20. Desirably, the fastener 42 is then additionally tightened by an amount sufficient to provide a continuous bias force at the respective contact points between the shaft ends 18, 20 and the shaft receiving apertures 40. Therefore, tightening of the fastener 42 not only locks an end of a shaft 18, 20 in fixed non-rotatable relationship with the respective bracket 22 in which it is received, but also biasedly maintains that fixed non-rotatable relationship of the shaft end 18, 20 with the bracket 22. Thus, during operation, the shaft ends 18, 20 are prevented from moving within the bracket opening 40 in which it is received. Even if such movement were to occur, additional tightening of the fastener 42 would reestablish a high bias force on the respective shaft end 18, 20. For that purpose, it is necessary that the frame contact face 34 of the base portion 30 of the bracket 22 not come into full, i.e. flush abutting, contact with the bracket mounting surface 24 of the side frames 12, 14. To prevent flush abutment, the angle a should have a value sufficient to permit tightening of the bracket 22 to an extent necessary to provide biased locking of the shaft ends 18, 20 in the respective shaft receiving aperture 40, without permitting the frame contact face 34 to come into full abutting contact with the bracket mounting surface 24 of the side rails 12, 14. If the frame contact face 34 of the bracket 22 were to be fully seated against the bracket mounting surface 24 of the side frame 12, 14, further tightening of the fastener 42 would not provide additional locking force at the shaft receiving aperture 40 of the flange portion 42, when a shaft end 18, 20 was received within the aperture 40.

The above-described bracket and roller installation procedure is repeated until the desired number of rollers 16 is installed on a section, or sections, of the roller conveyor 10. As described above, each of the rollers 16 are rotatably mounted on a shaft having spaced-apart ends 18, 20 that respectively extend through the shaft receiving aperture 40 of a selected one of the brackets 22. The conveyor 10 may either comprise straight sections, curved sections, or a combination of straight and curved sections. Typically, curved sections are formed by the use of tapered rollers wherein the diameter of the radially innermost end of the roller has a smaller diameter than the radially outer end of the roller.

Alternate embodiments of the bracket embodying the present invention, are illustrated in FIGS. 7–11. In FIGS. 7a and 7b, respectively side and top views, a bracket 72 is formed of a substantially flat plate having a base portion 73 disposed at a lower portion of the plate and a flange portion 74 disposed at an upper portion of the plate 72. An alignment embossment 75 is provided in the base portion 73, with a frame attachment fastener opening 77 extending through the alignment of embossment 75 and the base portion 77. As can be seen in FIG. 7b, showing a top view of the bracket 72, the shaft end receiving aperture 76 extending through the flange portion 74 of the bracket 72 is horizontally skewed with respect to the frame contact face 78 of the bracket 72.

Figure 8A:
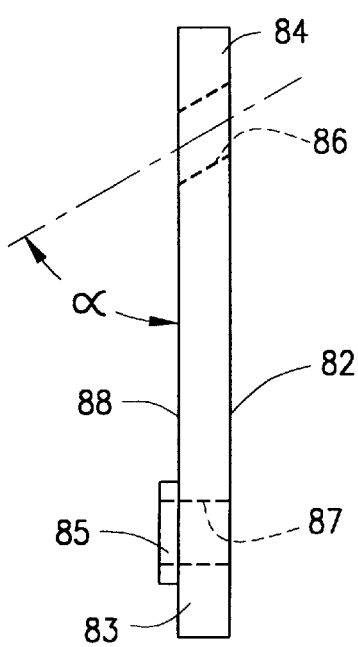
Figure 8A:
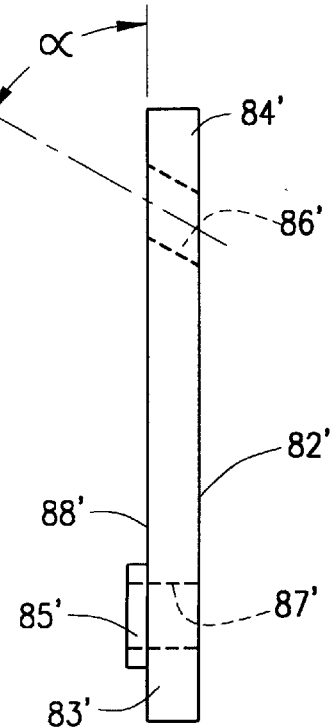

In another alternate embodiment of the present invention, shown in FIGS. 8a and 8b, the shaft end receiving apertures are vertically skewed with respect to the frame mounting contact face of the bracket. The vertical skew angle may be oriented in either in a vertically upward or downward direction. In FIG. 8a, the bracket 82 has substantially a flat plate construction with an alignment embossment 85 disposed on the base portion 83. A frame attachment opening 87 extends through the alignment embossment 85 and base portion 83 of the bracket 82. The brackets 82, 82' are identical in construction except for the skew angle of the respective shaft receiving apertures 86, 86'. In FIG. 8a, the shaft receiving aperture 86 is skewed vertically upward direction with respect to the frame contact face 88, whereas in FIG. 8b, the shaft end receiving aperture 86' is skewed in a vertically downward direction with respect to the frame contact face 88'. All other elements in FIG. 8b are identical in construction with those shown in 8a, and have been identified by the same reference numeral with a prime mark (') added after the corresponding reference number.

Other alternate embodiments of the bracket embodying the present invention are shown in FIGS. 9a and 9b. In these arrangements, tine flange portion 94, 94' is bent in a vertical direction with respect to the base portion 93, 93'. In FIG. 9a, the flange portion 94 is bent in a vertical direction toward the frame contact face 98, and the shaft end receiving aperture 96 is formed perpendicular with the skewed flange portion 94. An alignment embossment 95 is disposed adjacent the frame contact face surface 98 on the base portion 93 of the bracket 92, and a frame attachment fastener opening 97 extends through both the alignment embossment 95 and the base portion 93. In FIG. 9b, the structure of the bracket is similar to that shown in FIG. 9a, with corresponding elements of the bracket being indicated by the same reference numeral followed by a prime (') symbol. In the bracket assembly 96', in FIG. 9b, skewed in a vertically direction away from the plane of the frame contact face 98', and the shaft end receiving aperture 96' is formed perpendicular to the skewed flange portion 94'.

Yet in another alternate embodiment, the bracket embodying the present invention is illustrated in FIG. 10. In this illustrated embodiment, a bracket 102 is formed of a flat plate in which the upper portion comprising the flange portion 104 is twisted about a vertical axis with respect to the base portion 103. In this arrangement, the plane of the flange portion 104 and consequently the orientation of the shaft end receiving aperture 106, is displaced about a vertical axis by the angle a with respect to the plane of the frame contact face 108. Also, as in the previously described arrangements, an alignment embossment 105 is provided on the base portion 103 at a position adjacent the frame contact face 108. Also, a frame attachment fastener opening 107 extends through the alignment embossment 105 and the base portion 103 in perpendicular relationship with the frame contact face 108.

A bracket 112, suitable for use in mounting tapered rollers or roller systems in which one end of the roller shaft is elevationally offset from the opposite end of the shaft, is shown in FIG. 11. The bracket 112 is similar in all respects to the above-described bracket 32 illustrated in FIGS. 4–6, with the exception that the bracket 112 includes a pair of vertically aligned shaft end receiving apertures 116, 116'. As in the earlier-described bracket 32, the bracket 112 has a base portion 113, and a vertically extending flange portion 114. A frame contact face 118 is provided on the base portion 103, and alignment embossment 115 extends across the base portion 103 in adjacent relationship with the frame contact face 118. A frame attachment fastener opening 117 extends through the alignment embossment 115 and the base portion 113, in perpendicular relationship with the frame contact face 118. The provision of two vertically offset shaft end receiving apertures 116, 116' enables the installation of a shaft end in a selected one of the receiving apertures 116, 116', thereby enabling vertical displacement of one end of the roller shaft with respect to the other end.

Figure 7A:
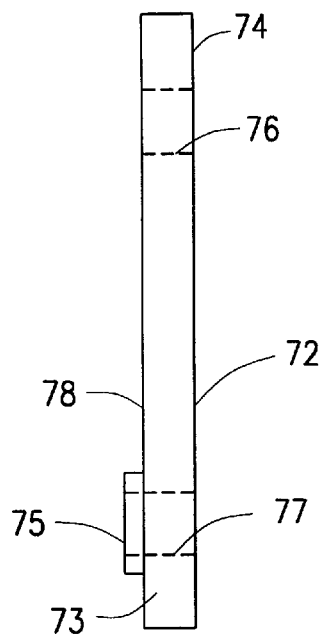
FIGS. 7a and 7b are a side and top view, respectively, of an alternate construction of the bracket embodying the present invention.
Figure 7B:
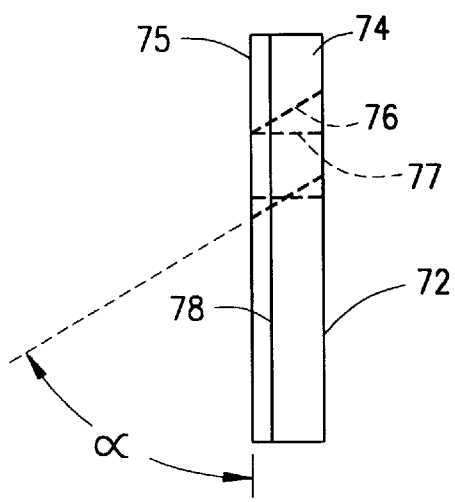

When the bracket 22 in FIGS. 2–6, the bracket 72 illustrated in FIGS. 7a and 7b, the bracket 102 illustrated in FIG. 10 and the bracket 112 illustrated in FIG. 11 are adapted to be installed in a vertically aligned relationship with a respective side frame 12, 14, and then the respective bracket is rotated about a vertical axis as a result of tightening the fastener 42. In this arrangement, the respective frame attachment fastener openings in the base portions and the shaft receiving apertures in the flange portions are disposed in vertically-spaced, horizontally oriented parallel planes, with the respective shaft receiving apertures skewed within their respective planes at angle a with the fastener opening in the respective base portion. When the respective frame attachment fastener openings and the shaft receiving apertures are aligned in the same vertical plane as illustrated by bracket 82 in FIGS. 8a and 8b, and bracket 92 in FIGS. 9a and 9b, the upper shaft receiving apertures are horizontally skewed with the respective lower frame attachment opening In this arrangement, the bracket 82, 92 after installation on a shaft end 18, 20, is rotated about a horizontal axis in response to tightening the fastener 40 and thereby locking the shaft end 18, 20 received within the aperture 86, 86', 96, 96' in biased fixed relationship with the supine bracket 82, 92.

Thus, it can be seen that the present invention provides a roller conveyor system 10, including a bracket 22, 72, 82, 82', 92, 92', 102, 112, whereby individual rollers can be easily replaced if damaged, misaligned rollers readily realigned, and wear resulting from movement between the shaft ends 18, 20 and the shaft receiving aperture 40, 76, 86, 86' 96, 96' 106, 116 in the mounting bracket Moreover, movement between the bracket and the side frame rail 14 is prevented, thus avoiding wear between the base portion of the bracket and the side frames 12, 14.

Although the present invention is described in terms of a preferred exemplary embodiment, with illustrative base and flange constructions, relative shaft and receiving aperture sizes and shapes, and angular relationships of the components, those skilled in the art will recognize that variations in sizes, shapes, illustrative constructions, and angular relationship may be made without departing from the spirit of the invention. Such changes are intended to fall within the scope of the following claims. Other aspects, features, and advantages of the present invention may be obtained from a study of this disclosure and the drawings, along with the appended claims.

What I claim is:

1. A bracket for fixedly supporting one end of a shaft, comprising:

a base portion having a frame contact face and an attachment fastener opening extending through the base portion in perpendicular relationship with the frame contact face;

a flange portion extending outwardly from the base portion in a radial direction with respect to the attachment fastener opening in the base portion and having a shaft receiving aperture extending through the flange portion at an oblique angle with respect to the frame contact face of the base portion, the shaft receiving aperture having a diameter slightly larger than a diameter of the supported shaft but the flange portion nonetheless tightly capturing the supported shaft when the shaft is moved into a position with respect to the bracket that is substantially perpendicular to the frame contact face.

2. A bracket, as set forth in claim 1, wherein the flange portion is obliquely disposed with respect to the frame contact face of the base portion, and the shaft receiving aperture extending through the flange portion is normal to said flange portion.

3. A bracket for fixedly supporting one end of a shaft, comprising:

a base portion having a frame contact face and an attachment fastener opening extending through the base portion in perpendicular relationship with the frame contact face;

a flange portion extending outwardly from the base Portion in a radial direction with respect to the attachment fastener opening in the base portion and having a shaft receiving aperture extending through the flange portion at an oblique angle with respect to the frame contact face of the base portion, wherein $\alpha$ represents the angular relationship between a line normal to the shaft receiving aperture extending through the flange portion and the frame contact face of the base portion of the bracket, $d_1$ represents the diameter of the shaft receiving aperture extending through the flange portion, $d_2$ represents the diameter of an end of a preselected shaft to be received within the shaft receiving aperture extending through the flange portion, and t represents the thickness of the flange portion through which the shaft receiving aperture extends, the diameter of the shaft receiving aperture being represented by:

$$\frac{d_2}{\cos\alpha} + t\tan\alpha > d_1 > d_2.$$

4. A bracket, as set forth in claim 3, wherein the cross section of the end of the preselected shaft and the shaft receiving aperture extending through the flange portion of the b racket define similarly-shaped polygons, $d_1$ being the diameter of a circle circumscribing the polygonal opening extending through the flange portion, and $d_2$ being the diameter of a circle circumscribing the polygonal cross section of the end of said predefined shaft.

5. A bracket, as et forth in claim 4, wherein said defined similarly-shaped polygons are hexagons.

6. A bracket for fixedly supporting one end of a shaft, comprising:

a base portion having a frame contact face and an attachment fastener opening extending through the base portion in perpendicular relationship with the frame contact face;

a flange portion extending outwardly from the base portion in a radial direction with respect to the attachment fastener opening in the base portion and having a shaft receiving aperture extending through the flange portion at an oblique angle with respect to the frame contact face of the base portion, wherein the bracket has an alignment embossment extending outwardly from the frame contact face of the base portion.

7. A bracket, as set forth in claim 6, wherein said base portion and said flange portion have the same thickness.

8. A bracket for fixedly supporting one end of a shaft, comprising:

a base portion having a frame contact face and an attachment fastener opening extending through the base portion in perpendicular relationship with the frame contact face;

a flange portion extending outwardly from the base portion in a radial direction with respect to the attachment fastener opening in the base portion and having a shaft receiving aperture extending through the flange portion at an oblique angle with respect to the frame contact face of the base portion, wherein said flange portion has a pair of vertically aligned shaft receiving apertures extending through said flange portion.

9. A bracket for fixedly supporting one end of a shaft, comprising:

a base portion having a frame contact face and an attachment fastener opening extending through the base portion in perpendicular relationship with the frame contact face;

a flange portion extending outwardly from the base portion in a radial direction with respect to the attachment fastener opening in the base Portion and having a shaft receiving aperture extending through the flange portion at an oblique angle with respect to the frame contact face of the base portion, wherein said frame contact face of the base portion defines a vertical plane and said oblique angle at which said shaft receiving aperture is disposed with respect to the frame contact face of the base portion is disposed in a plane normal to said vertical plane.

10. A bracket, as set forth in claim 1, wherein said contact face of the base portion defines a vertical plane and said shaft receiving aperture has a longitudinal axis, and said oblique angle at which said shaft receiving aperture is disposed with respect to the frame contact face of the base portion is the angular relationship between said longitudinal axis and said vertical plane.

11. A roller conveyor comprising:
a pair of longitudinally extending side frames, each one of said side frames having a bracket mounting surface, a recessed channel, and a slotted opening providing communication between the bracket mounting surface and the recessed channel;
a plurality of brackets mounted on each frame of the pair of the side frames, each of the brackets having a base portion and a flange portion, said base portion having a frame contact face and a first opening extending through the base portion in perpendicular relationship with the frame contact face, and said flange portion having a second opening extending through the flange portion in oblique angular relationship with the frame contact face of the base portion;
a plurality of fasteners each adapted for attaching one of the brackets to a selected one of the side frames, each fastener having a first portion extending through the first opening in the base portion of the respective bracket and a second portion disposed in nonrotatable relationship within the recessed channel of the selected side frame to which the bracket is attached, and
a plurality of rollers each rotatably mounted on a shaft having spaced apart ends that extend through the second opening through the flange portion of a selected one of the brackets, said roller shaft being maintained in biased nonrotatable relationship with respect to the selected bracket in response to tightening the fastener by which the selected bracket is mounted to one of the side frames.

12. A roller conveyor, as set forth in claim 11, wherein the flange portion of each bracket is obliquely disposed with respect to the frame contact face of the base portion, and the second opening extending through the flange portion is normal to said flange.

13. A roller conveyor, as set forth in claim 11, wherein a represents the angular relationship between a line normal to the second opening extending through the flange portion and the frame contact face of the base portion of the bracket, $d_1$ represents the diameter of the second opening extending through the flange portion, $d_2$ represents the diameter of one end of the shaft on which a respective one of the rollers is rotatably mounted, and t represents the thickness of the flange portion through which the second opening extends, the diameter of the second opening being defined by:

$$\frac{d_2}{\cos\alpha} + t\pi\tan\alpha > d_1 > d_2.$$

14. A roller conveyor, as set forth in claim 13, wherein the cross section of the ends of the shafts on which said rollers are mounted and the second opening extending through the flange portion of the brackets define similarly-shaped polygons, $d_1$ being the diameter of a circle circumscribing the polygonal opening extending through the flange portion, and $d_2$ being the diameter of a circle circumscribing the polygonal cross section of the ends of said shafts.

15. A roller conveyor, as set forth in claim 14, wherein said defined similarly-shaped polygons are hexagons.

16. A roller conveyor, as set forth in claim 11, wherein each of the brackets have an alignment embossment extending outwardly from the frame contact face of the base portion, said embossment being adapted to be received within the slotted opening of one of said side frames.

17. A roller conveyor having a longitudinal centerline and comprising:
a plurality of fasteners each having separable first and second portions;
a pair of side frames, one side frame of said pair of side frames being disposed on a respective transversely spaced side of said longitudinal center in opposed relationship with the other side frame of said pair of side frames and having a bracket mounting surface formed on a portion facing inwardly toward the centerline of said roller conveyor, a longitudinally extending recessed channel adapted to receive and nonrotatably retain the first portion of one of said fasteners therein, and a longitudinal opening providing communication between the bracket mounting surface and the recessed channel;
a plurality of brackets, each of said brackets comprising a base portion and a flange portion extending outwardly from the base portion, said base portion having a frame contact face, a front face spaced from said frame contact face and in parallel planar relationship therewith, and an opening extending between the frame contact face and the front face at a perpendicular angle with respect to said frame contact face and said front face and adapted to receive the second portion of said one of the fasteners therethrough, and said flange portion having a opening extending therethrough at an oblique angle with respect to the frame contact face of the base portion, each of said brackets being mounted to a respective one of said side frames by the first portion of one of the fasteners nonrotatably retained within the recessed channel of said respective side frame and by the second portion of said one of the fasteners extending through the opening in the base portion of the bracket and adjustably engaging the first portion of said one of the fasteners; and
a plurality of rollers each rotatably mounted on a respective shaft having spaced apart ends, each of said rollers being disposed in alignment with a preselected pair of said brackets with each the spaced apart ends of the roller shaft extending through the opening in the flange portion of one of said brackets, said roller shaft being maintained in biased nonrotatable relationship with respect to the bracket in response to tightening the respective one of the fasteners by which the bracket is mounted to the side frame.

18. A roller conveyor, as set forth in claim 17, wherein the flange portion of each bracket is obliquely disposed with respect to the frame contact face of the base portion, and the second opening extending through the flange portion is normal to said flange.

19. A roller conveyor, as set forth in claim 17, wherein α represents the angular relationship between a line normal to the second opening extending through the flange portion and the frame contact face of the base portion of the bracket, $d_1$ represents the diameter of the second opening extending through the flange portion, $d_2$ represents the diameter of one end of the shaft on which a respective one of the rollers is rotatably mounted, and t represents the thickness of the flange portion through which the second opening extends, the diameter of the second opening being defined by:

$$\frac{d_2}{\cos\alpha} + t\tan\alpha > d_1 > d_2.$$

20. A roller conveyor, as set forth in claim 19, wherein the cross section of the ends of the shafts on which said rollers are mounted and the second opening extending through the flange portion of the brackets define similarly-shaped polygons, $d_1$ being the diameter of a circle circumscribing the polygonal opening extending through the flange portion, and $d_2$ being the diameter of a circle circumscribing the polygonal cross section of the ends of said shafts.

21. A roller conveyor, as set forth in claim 20, wherein said defined similarly-shaped polygons are hexagons.

22. A roller conveyor, as set forth in claim 17, wherein each of the brackets have an alignment embossment extending outwardly from the frame contact face of the base portion, said embossment being adapted to be received within the slotted opening of one of said side frames.

23. A roller conveyor having a longitudinal centerline and comprising:

a plurality of fastener members each having separable first and second portions;

a pair of side frames comprising first and second frames each extending longitudinally along said roller conveyor, said first frame being transversely spaced in a first direction from said centerline and said second frame being transversely spaced in a second direction opposite the first direction from said centerline, said first and second frames each having a bracket mounting surface formed on a portion of the respective frame facing inwardly toward the centerline of said roller conveyor, a recessed channel extending longitudinally along the respective frame and adapted to receive and nonrotatably retain the first portion of one of said fastener member therein, and a longitudinal opening in each of the frames providing communication between the bracket mounting surface and the recessed channel of each of the frames;

a plurality of rollers each of which are rotatable mounted on a respective shaft having spaced apart ends;

a plurality of brackets, each of said brackets having a base portion comprising a frame contact face and a fastener opening extending through the base portion, at a perpendicular angle with respect to said frame contact face and adapted to receive the second portion of said one of the fastener members therethrough, and a flange portion extending outwardly from said base portion in a radial direction with respect to said fastener opening through th(e base portion and having a opening extending through said flange portion at an oblique angle with respect to the frame contact face of the base of the bracket, said brackets being mounted on the first and second frames in transversely aligned pairs with the brackets mounted on said first frame being in transverse alignment with a respective one of the brackets mounted on said second frame, the frame contact face of the base portion of each the brackets being maintained at a position adjacent the bracket mounting surface of a respective frame by one of said fastener members in which the first portion of the fastener member is disposed within the recessed channel of the respective frame and the second portion of the fastener member extends through the opening in the base portion of the respective bracket, and each of said rollers being disposed in alignment with a preselected pair of said aligned pairs of brackets with the spaced apart ends of each of said rollers extending through respective openings in the flange portions ot the transversely aligned brackets and maintained in biased nonrotatable relationship with the respective transversely aligned brackets in response to tightening said fastener members having a second portion inserted through the opening in the base of the respective bracket.

24. A roller conveyor, as set forth in claim 23, wherein the flange portion of each bracket is obliquely disposed with respect to the frame contact face of the base portion, and the second opening extending through the flange portion is normal to said flange.

25. A roller conveyor, as set forth in claim 23, wherein $\alpha$ represents the angular relationship between a line normal to the second opening extending through the flange portion and the frame contact face of the base portion of the bracket, $d_1$ represents the diameter of the second opening extending through the flange portion, $d_2$ represents the diameter of one end of the shaft on which a respective one of the rollers is rotatably mounted, and t represents the thickness of the flange portion through which the second opening extends, the diameter of the second opening being represented by:

$$\frac{d_2}{\cos\alpha} + t\tan\alpha > d_1 > d_2.$$

26. A roller conveyor, as set forth in claim 25, wherein the cross section of the ends of the shafts on which said rollers are mounted and the second opening extending through the flange portion of the brackets define similarly-shaped polygons, $d_1$ being the diameter of a circle circumscribing the polygonal opening extending through the flange portion, and $d_2$ being the diameter of a circle circumscribing the polygonal cross section of the ends of said shafts.

27. A roller conveyor, as set forth in claim 26, wherein said defined similarly-shaped polygons are hexagons.

28. A roller conveyor, as set forth in claim 23, wherein each of the brackets have an alignment embossment extending outwardly from the frame contact face of the base portion, said embossment being adapted to be received within the slotted opening of one of said side frames.

29. Amounting system for a conveyor roller having opposed shafts, comprising:

a pair of brackets for mounting to an opposed pair of conveyor side frames, each bracket for supporting one of the opposed shafts, at least one of the pair of brackets comprising:

a base portion having a conveyor frame contact face and a conveyor frame attachment opening extending through the base portion in perpendicular relationship with the frame contact face; and a flange portion extending outwardly from the base portion in a radial direction with respect to the attachment fastener opening in the base portion and having a shaft receiving aperture extending through the flange portion at an oblique angle with respect to the frame contact face of the base portion, wherein the shaft receiving aperture in the at least one of the pair of brackets tightly captures one of the opposed shafts when the conveyor roller is mounted between the pair of brackets in an orientation that is substantially perpendicular to the frame contact face.

30. The mounting system of claim 29 wherein said frame contact face of the base portion defines a vertical plane and said oblique angle at which said shaft receiving aperture is disposed with respect to the frame contact face of the base portion is disposed in a plane normal to said vertical plane.

31. The mounting system of claim 29 wherein said frame contact face of the base portion defines a vertical plane and said shaft receiving aperture has a longitudinal axis, and said oblique angle at which said shaft receiving aperture is disposed with respect to the frame contact face of the base portion is the angular relationship between said longitudinal axis and said vertical plane.

32. The mounting system of claim 29 wherein each bracket includes an alignment embossment extending outwardly from the frame contact face of the base portion to engage the conveyor side frame.

33. A bracket for fixedly supporting one end of a shaft, comprising:
- a base portion having a frame contact face and an attachment fastener opening extending through the base portion in perpendicular relationship with the frame contact face;
- a flange portion extending outwardly from the base portion in a radial direction with respect to the attachment fastener opening in the base portion, the flange portion being twisted about an axis extending in the radial direction and having a shaft receiving aperture extending perpendicularly through the flange portion at an oblique angle with respect to the frame contact face of the base portion.

34. The bracket of claim 33 including an alignment embossment extending outwardly from the frame contact face of the base portion.

35. The bracket of claim 33 wherein the shaft receiving aperture has a diameter slightly larger than a diameter of the supported shaft but the flange portion nonetheless tightly captures the supported shaft when the shaft is moved into a position with respect to the bracket that is substantially perpendicular to the frame contact face.

36. A bracket for fixedly supporting one end of a shaft, comprising:
- a flat plate defining a surface plane, the plate having:
  - a base portion including an attachment fastener opening extending through the base portion in a perpendicular relationship with the surface plane; and
  - a flange portion extending outwardly from the base portion in a radial direction with respect to the attachment fastener opening in the base portion and including a shaft receiving aperture extending through the flange portion in an oblique relationship with respect to the surface plane.

37. The bracket of claim 36 including an alignment embossment extending outwardly from the base portion of the flat plate.

38. The bracket of claim 36 wherein the shaft receiving aperture has a diameter slightly larger than a diameter of the supported shaft but nonetheless tightly captures the supported shaft when the shaft is moved into a position with respect to the bracket that is substantially perpendicular to the surface plane.

39. The bracket of claim 36 wherein the oblique relationship orients the shaft receiving aperture skewed in the radial direction.

40. The bracket of claim 36 wherein the oblique relationship orients the shaft receiving aperture skewed in a direction perpendicular to the radial direction.

41. A roller conveyor assembly, comprising:
- a longitudinally extending side frame having a bracket mounting surface;
- a plurality of brackets mounted along the side frame, each of the brackets having a base portion and a flange portion, said base portion having a frame contact face and a first opening extending through the base portion in perpendicular relationship with the frame contact face, and said flange portion having a second opening extending through the flange portion in oblique angular relationship with the frame contact face of the base portion;
- a plurality of fasteners for attaching the brackets to the side frame using the first opening in the base portion of each bracket; and
- a plurality of rollers each rotatable mounted on a shaft having an end that extends through the second opening in the flange portion of a selected bracket, said roller shaft being maintained in biased non-rotatable relationship with respect to the selected bracket in response to orientating the roller into a position substantially perpendicular to the bracket mounting surface.

42. The roller conveyor assembly of claim 41 wherein the flange portion of each bracket is obliquely disposed with respect to the frame contact face of the base portion, and the second opening extending through the flange portion is normal to said flange.

43. The roller conveyor assembly of claim 41 wherein a represents the angular relationship between a line normal to the second opening extending through the flange portion and the frame contact face of the base portion of the bracket, $d_1$ represents the diameter of the second opening extending through the flange portion, $d_2$ represents the diameter of one end of the shaft on which a respective one of the rollers, is rotatably mounted, and t represents the thickness of the flange portion through which the second opening extends, the diameter of the second opening being defined by:

$$\frac{d_2}{\cos\alpha} + t\tau\tan\alpha > d_1 > d_2.$$

44. The roller conveyor assembly of claim 43 wherein the cross section of the ends of the shafts on which said rollers are mounted and the second opening extending through the flange portion of the brackets define similarly-shaped polygons, $d_1$ being the diameter of a circle circumscribing the polygonal opening extending through the flange portion, and $d_2$ being the diameter of a circle circumscribing the polygonal cross section of the ends of said shafts.

45. The roller conveyor assembly of claim 44 wherein said defined similarly-shaped polygons are hexagons.

46. The roller conveyor assembly of claim 41 wherein each of the brackets have an alignment embossment extending outwardly from the frame contact face of the base portion, said embossment being adapted to be received within a slot in the side frame.

47. The roller conveyor assembly of claim 41 wherein the base portion and the flange portion of each bracket comprise a flat plate defining a surface plane, the flange portion extending outwardly from the base portion in a radial direction with respect to the first opening in the base portion, and the second opening extending through the flange portion in an oblique relationship with respect to the surface plane.

48. The roller conveyor assembly of claim 47 wherein the oblique relationship orients the shaft receiving aperture skewed in the radial direction.

49. The roller conveyor assembly of claim 47 wherein the oblique relationship orients the shaft receiving aperture skewed in a direction perpendicular to the radial direction.

50. The roller conveyor assembly of claim 41 wherein the flange portion extends outwardly from the base portion in a radial direction with respect to the first opening in the base portion, the flange portion being twisted about an axis extending in the radial direction and the second opening extending perpendicularly through the flange portion at an oblique angle with respect to the frame contact face of the base portion.

* * * * *

UNITED STATES PATENT AND TRADEMARK OFFICE
CERTIFICATE OF CORRECTION

PATENT NO. : 6,161,681
DATED : December 19, 2000
INVENTOR(S) : W. Scott Kalm

It is certified that error appears in the above-identified patent and that said Letters Patent is hereby corrected as shown below:

Column 1,
Line 40, replace "copposite" with -- opposite --

Column 2,
Line 57, replace "a" with -- $\alpha$ --

Column 3,
Line 37, replace "a" with -- $\alpha$ --

Column 5,
Lines 6 and 48, replace "a" with -- $\alpha$ --

Column 6,
Line 59, replace "a" with -- $\alpha$ --

Column 8,
Lines 9 and 48, replace "a" with -- $\alpha$ --

Column 10,
Line 8, replace "b racket" with -- bracket --

Column 11,
Line 41, replace "a" with -- $\alpha$ --

Column 13,
Line 51, replace "th (e" with -- the --

UNITED STATES PATENT AND TRADEMARK OFFICE
CERTIFICATE OF CORRECTION

PATENT NO. : 6,161,681
DATED : December 19, 2000
INVENTOR(S) : W. Scott Kalm

It is certified that error appears in the above-identified patent and that said Letters Patent is hereby corrected as shown below:

Column 14,
Line 42, replace "Amounting" with -- A mounting --

Column 16,
Line 20, replace "a" with -- $\alpha$ --

Signed and Sealed this

Twenty-sixth Day of February, 2002

Attest:

JAMES E. ROGAN
*Attesting Officer*   *Director of the United States Patent and Trademark Office*